United States Patent [19]

Mullen et al.

[11] Patent Number: 5,679,760
[45] Date of Patent: Oct. 21, 1997

[54] LADDER POLYMERS CONTAINING CONJUGATED DOUBLE BONDS

[75] Inventors: Klaus Mullen, Mainz-Bretzenheim; Ullrich Scherf, Mainz-Kastell, both of Germany

[73] Assignee: Hoechst Aktiengesellschaft, Frankfurt, Germany

[21] Appl. No.: 410,004

[22] Filed: Mar. 21, 1995

Related U.S. Application Data

[63] Continuation of Ser. No. 104,104, Aug. 12, 1993, abandoned.

[30] Foreign Application Priority Data

Apr. 11, 1991 [DE] Germany ............ 41 11 878.2

[51] Int. Cl.[6] .................................... C08G 06/00
[52] U.S. Cl. ............ 528/220; 528/271; 528/396; 528/397; 528/480; 528/491; 528/492; 252/500
[58] Field of Search .................. 528/220, 271, 528/396, 397, 480, 491, 492; 252/500

[56] References Cited

U.S. PATENT DOCUMENTS

| | | | |
|---|---|---|---|
| 4,375,427 | 3/1983 | Mille et al. | 429/213 |
| 4,452,725 | 6/1984 | Wellinghoff et al. | 528/492 |
| 4,568,483 | 2/1986 | Naarmann et al. | 252/500 |
| 4,618,453 | 10/1986 | Kim | 528/128 |
| 4,729,851 | 3/1988 | Bräunling et al. | 252/500 |
| 4,771,111 | 9/1988 | Tieke et al. | 252/500 |

FOREIGN PATENT DOCUMENTS 0357059  3/1990  European Pat. Off. .

OTHER PUBLICATIONS

Webster II Dictionary, Riverside Edition, p. W1 Def of "Radical" (1979).
Bailey et al., "New Spiro Polymers Containing Five, Six, Seven+Eight Membered Rings", Polymer Preprints CA #78:16492 (1971).
Stille et al., "Hydrocarbon Ladder Aromatics", Journal of Polymer Science, CA #73:77732 (1970).

*Primary Examiner*—Cecilia J. Tsang
*Assistant Examiner*—Patrick R. Delaney
*Attorney, Agent, or Firm*—Curtis, Morris & Safford, P.C.

[57] ABSTRACT

The present invention relates to polymers with an extended system of conjugated double bonds constructed as homo and/or heterocyclic rings which are interlinked in pairs so that one ring is joined to the neighboring one at two adjacent atoms in the ring, in which one of these connections is made by a chemical bond to a ring atom of the neighboring ring and the other via a carbon, nitrogen, oxygen or sulphur atom to an atom of the neighboring ring adjacent said ring atom, their production and use in electrical, electronic and optoelectronic components.

18 Claims, No Drawings

LADDER POLYMERS CONTAINING CONJUGATED DOUBLE BONDS

This application is a continuation of application Ser. No. 08/104,104, filed Aug. 12, 1993, now abandoned.

BACKGROUND OF THE INVENTION

1) Field of the Invention

The present invention relates to novel polymers containing conjugated double bonds which are built up from carbocyclic and/or heterocyclic rings, and each of these rings is linked to the adjacent ring at two bonding points in the manner of a conductor (ladder polymers).

2) Prior Art

Polypyrroles and copolymers thereof are described, inter alia, in EP-A-99 984. EP-A-218 093 outlines polymers containing conjugated double bonds in which (hetero) aromatic rings are each bonded to one another via a carbon atom.

Ladder polymers containing a conjugated double bond are formed, as is known, on graphitization of polyacrylonitrile or on pyrrolysis of this polymer, in the presence of dehydrogenating catalysts and are known as "black Orlon" ("ORLON" is a registered trademark of E. I. Du Pont de Nemours Co.). According to the constitution proposed for this polymer, it comprises dihydropyrrole units which are bonded to each adjacent unit both by a methine group and by a nitrogen atom. Intramolecular ring closure in poly(vinyl methyl ketone) forms a polymer comprising tetrahydrobenzene units which are bonded to each adjacent unit both via a methylene group and via a methine group.

The object of the present invention was to synthesize novel substances, in particular novel intermediates for the preparation of electroconductive polymers or polymers having nonlinear optical properties. A further object of the present invention was to provide a novel process for the preparation of polymers. A further object of the present invention was to provide novel polymers. A final object of the present invention was to produce thin layers on substrates which are suitable for use of the polymers for optical, electrooptical and electronic purposes.

SUMMARY OF THE INVENTION

The abovementioned objects are achieved by the present invention which provides polymers having an extended system of conjugated double bonds, built up from homocyclic and/or heterocyclic rings which are each bonded to one another in pairs, so that each ring is linked to the adjacent ring through two vicinal ring atoms, wherein one of these links is formed by a chemical bond to a ring atom of the adjacent ring and the other is formed via a carbon, oxygen, nitrogen or sulfur atom to an atom of the adjacent ring which is vicinal to the abovementioned ring atom.

The polymers according to the invention differ from the above ladder polymers described as the prior art through the fact that the units are bonded to one another in each case both through a chemical bond and via an atom as bridge. This type of linking causes the formation of a five-membered ring and not—as in the known ladder polymers—a six-membered ring.

DESCRIPTION OF THE PREFERRED EMBODIMENTS

The polymers according to the invention are preferably built up from units of the formula (1)

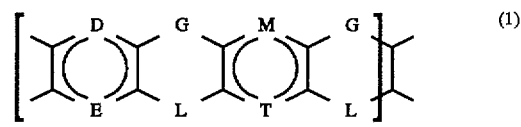

in which

D and M, independently of one another, are each a chemical bond or a radical of the formula C—R in which C is a carbon atom, and R are identical or different radicals, namely hydrogen atoms or optionally substituted $C_1$- to $C_{20}$-hydrocarbon radicals, E and T, independently of one another, are each an oxygen or sulfur atom, a radical of the formula N—R, or, if the radical D or M belonging to the same ring is a radical of the formula C—R, may alternatively be a radical of the formula C—R, and in each ring one of the radicals G and L is a single chemical bond, and in each ring the radical of G and L which is not a single bond is a radical of the formula $CR_2$, where at least one of the radicals R is preferably a hydrogen atom, or can be prepared by dehydrogenation of polymers built up from units of the formula (1).

Preferred polymers according to the invention are those built up from units of the formulae (4), (5) and/or (6) or the polymers which can be prepared from these polymers by removal of two hydrogen atoms per unit (dehydrogenation).

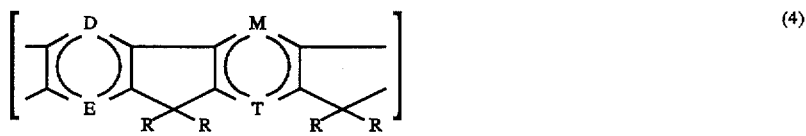

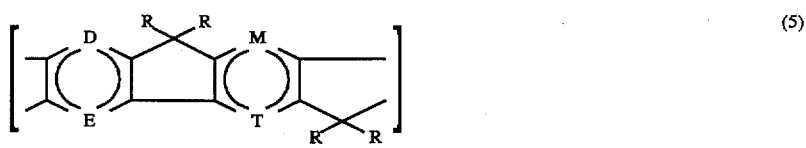

-continued

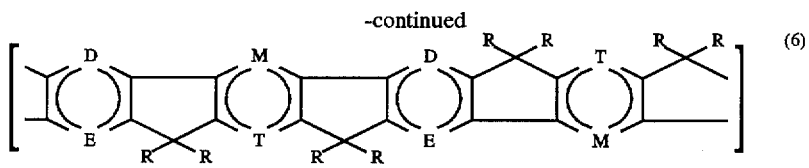 (6)

It is preferred if one of the radicals G and L in each ring in the above formula (1) is a chemical bond, while the other radical is in each case a radical of the formula CHR.

The radicals D and E are preferably radicals of the formula C—R.

The radicals M and T are preferably radicals of the formula C—R.

Preferred polymers according to the invention are those built up from units of the formulae (7), (8), (9), (10), (11) and/or (12).

Examples of radicals R are hydrogen atoms; alkyl radicals, such as the methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical and octadecyl radicals, such as the n-octadecyl radical; alkenyl radicals, such as the vinyl and allyl radicals; cycloalkyl radicals, such as cyclopentyl, cyclohexyl, cycloheptyl and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the alpha- and β-phenylethyl radicals.

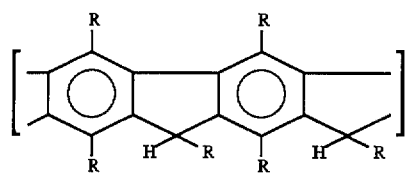 (7)

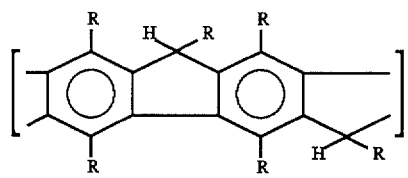 (8)

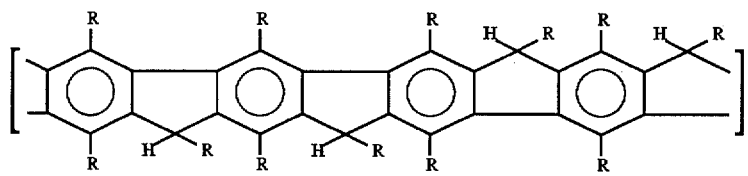 (9)

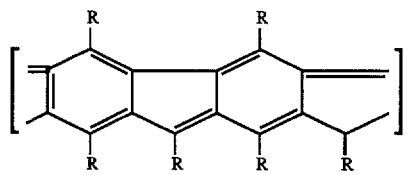 (10)

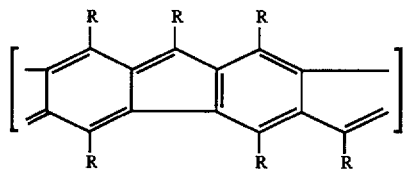 (11)

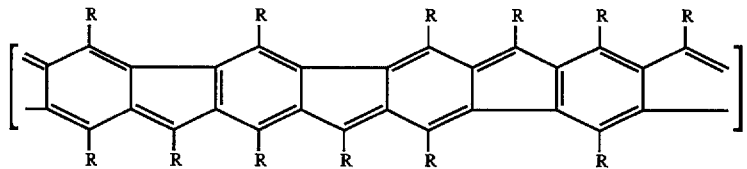 (12)

Examples of substituted radicals R are cyanoalkyl radicals, such as the β-cyanoethyl radical, and halogenated hydrocarbon radicals, for example haloalkyl radicals, such as 3,3,3-trifluoro-n-propyl radical, the 2,2,2,2',2',2'-hexafluoroisopropyl radical, and the heptafluoroisopropyl radical, and haloaryl radicals, such as the o-, m- and p-chlorophenyl radicals.

The polymers according to the invention may contain dopes. Addition of such known dopes allows the conductivity of the polymers to be increased.

Examples of dopes are alkali metals, such as sodium or potassium; protonic acids, such as $H_2SO_4$, $HClO_4$, $H_2Cr_2O_7$, HI and $HNO_3$; Lewis acids, such as $SbCl_5$, $AsCl_5$, $TiCl_4$, $FeCl_3$, $SnCl_4$, $ZnCl_2$ and $AsF_5$, and halogen, such as, for example, iodine. Treatment of the compositions according to the invention with dopes (n) is generally carried out by allowing the vapors or solutions of the dope to act on the polymers. This is usually carried out at from about 10° to 30° C., usually with exclusion of moisture, frequently with exclusion of air. The doped polymers preferably contain from 0.01 to 30% by weight, in particular from 0.1 to 20% by weight, of dope.

The polymers according to the invention may also be finely distributed in a further polymer. They may be distributed, inter alia, in the matrix of a thermoplastic polymer. The preparation of such polymer mixtures is described in EP-A-357 059. The distribution of the polymers according to the invention in the matrix of a further polymer allows the processing properties and physical properties of the polymers according to the invention to be improved.

The polymers according to the invention can be prepared by (A) polymerizing at least one compound of the formula (2)

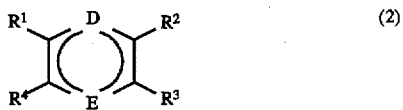

with at least one compound of the formula (3)

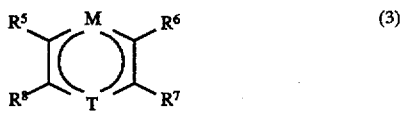

in the presence of at least one heavy metal and/or compounds thereof, where, in the above formulae (2) and (3), two of the radicals $R^1$, $R^2$, $R^3$ and $R^4$ are halogen atoms, preferably bromine atoms, and the other two of the radicals $R^1$, $R^2$, $R^3$ and $R^4$ are radicals of the formula —C(R)=O, and two of the radicals $R^5$, $R^6$, $R^7$ and $R^8$ are radicals of the formula —B(OR)$_2$, and the two other radicals $R^5$, $R^6$, $R^7$ and $R^8$ are each as defined for the radical R, and D, E, M, R and T are as defined in claim 2, (B) reducing the carbonyl groups to carbinol groups in a manner known per se, (C) condensing the resultant polymer with the carbinol groups with cyclization, and optionally (D) dehydrogenating the resultant polymer in a manner known per se, and, if desired, (E) adding dopes to the polymer.

The heavy metals and/or compounds thereof employed in step (A) are preferably the metals and metal compounds known as hydrogenation catalysts, in particular palladium and nickel or compounds thereof.

The reduction in step (B) is preferably effected by a metal hydride or an organometallic compound. Preferred metal hydrides are lithium hydride, sodium hydride, potassium hydride, lithium aluminum hydride and sodium borohydride. Preferred organometallic compounds are metal alkyl compounds, such as n-butyllithium, sec-butyllithium, t-butyllithium, phenyllithium, and Grignard reagents.

Step (C) is preferably carried out in the presence of at least one Brönstedt or Lewis acid, in particular in the presence of a Lewis acid. Examples of Lewis acids are $BF_3$, $AlCl_3$, $TiCl_4$, $SnCl_4$, $SO_3$, $PCl_5$, $POCl_3$, $FeCl_3$ and hydrates thereof and $ZnCl_2$; examples of Brönstedt acids are hydrochloric acid, hydrobromic acid, sulfuric acid, chlorosulfonic acid, phosphoric acids, such as ortho-, meta- and polyphosphoric acids, boric acid, selenous acid, nitric acid, acetic acid, propionic acid, haloacetic acids, such as trichloro- and trifluoroacetic acid, oxalic acid, p-toluenesulfonic acid, acidic ion exchangers, acidic zeolites, acid-activated bleaching earths, acid-activated carbon black, hydrogen fluoride, hydrogen chloride and the like.

Step (D) can be carried out in the presence of known oxidants. These oxidants may also be dopes with an oxidative action, which makes further doping superfluous. Step (D) is preferably carried out under a protective gas in order to prevent contact with oxygen during the reaction.

The process according to the invention can be carried out in the presence or absence of solvents. If solvents are used, solvents or solvent mixtures having a boiling point or boiling range of up to 120° C. at 0.1 MPa are preferred. Examples of such solvents are ethers, such as dioxane, tetrahydrofuran, diethyl ether and diethylene glycol dimethyl ether; chlorinated hydrocarbons, such as dichloromethane, trichloromethane, tetrachloromethane, 1,2-dichloroethane and trichloroethylene; hydrocarbons, such as pentane, n-hexane, hexane isomer mixtures, heptane, octane, naphtha, petroleum ether, benzene, toluene, and xylenes; ketones, such as acetone, methyl ethyl ketone and methyl isobutyl ketone; carbon disulfide and nitrobenzene, or mixtures of these solvents.

The term solvent does not mean that all reaction components must dissolve therein. The reaction can also be carried out in a suspension or emulsion or one or more reactants. The reaction can also be carried out in a solvent mixture having a miscibility gap, where in each case at least one reactant is soluble in each of the mixture phases.

The polymers according to the invention have significant electroconductivity and have nonlinear optical properties. They can be employed in electrical, electronic and optoelectronic components.

In the examples below, unless stated otherwise, a) all amount data are based on the weight;
b) all pressures are 0.10 MPa (abs.);
c) all temperatures are 20° C.;
d) the gel permeation chromatograms are calibrated using polystyrene.

EXAMPLES

Example 1

(A) 5 ml of 2N sodium carbonate solution are added under an inert gas to a solution of 0.725 g of 4,4"-didecyl-2',5'-dibromoterephthalophenone (1 mmol) and 0.334 g of 2,5-dihexyl-1,4-phenylenediboronic acid (1 mmol) in 5 ml of toluene. The mixture prepared in this way was heated under reflux. 30 mg of tetrakis(triphenylphosphino)palladium(0)

(0.026 mmol) in 5 ml of toluene were subsequently added. After the mixture had been refluxed for 24 hours, the polymer formed was precipitated by pouring into acetone, washed until acidic and taken up in a little toluene. Drying of the solution, evaporation and reprecipitation using acetone gave 535 mg of the polymer of the formula (13) below, in which R is n-decyl and R' is n-hexyl.

Yield: 66% of theory.

Elemental analysis: calculated: C: 86.08%; H: 9.96%; found: C: 85.85%; H: 10.19%;

Molecular weight according to gel permeation chromatogram:

Number average ($M_n$): 6,500; weight average: ($M_w$): 8,700.

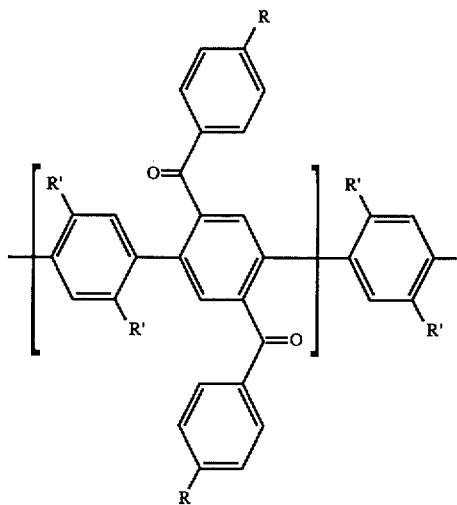

(13)

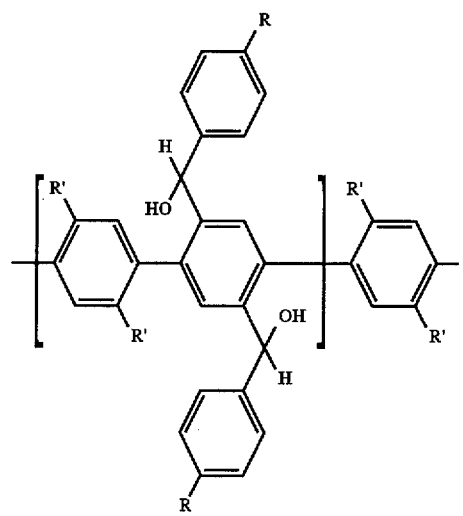

(14)

(C) 76 mg (0.0934 mmol) of the polymer obtained as in (B) were dissolved in 50 ml of dichloromethane, and 300 mg (2.11 mmol) of boron trifluoride diethyl etherate were added. After 5 minutes, 20 ml of ethanol and finally 50 ml of water were added with stirring. The organic phase was washed, dried and evaporated. Precipitation by means of acetone gave 62 mg of a polymer of the formula (15) below.

Yield: 85% of theory.

Elemental analysis: calculated: C: 89.63%; H: 10.37%; found: C: 88.77%; H: 11.20%;

Molecular weight according to gel permeation chromatogram:

Number average ($M_n$): 6,200; weight average: ($M_w$): 8,300.

(B) 200 mg (0.024 mmol) of the polymer prepared as in (A) were reduced using LiAlH$_4$ in 40 ml of toluene/tetrahydrofuran (1:1). After the mixture had been stirred at room temperature for 30 minutes, the excess hydride was carefully decomposed and the product was washed with 2N hydrochloric acid and with water. The organic phase was dried, the solvent mixture was removed by distillation, and the polymer was taken up in a little tetrahydrofuran and precipitated in water, giving 167 mg of the polymer of the formula (14) below.

Yield: 84% of theory.

Elemental analysis: calculated: C: 85.66%; H: 10.41%; found: C: 84.12%; H: 10.59%;

Molecular weight according to gel permeation chromatogram:

Number average ($M_n$): 5,100; weight average: ($M_w$): 8,000.

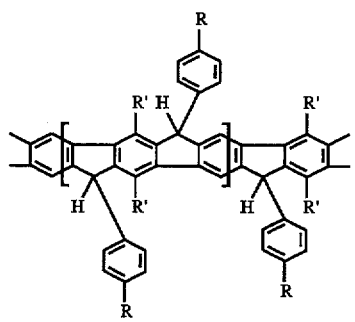

(15)

(D) 50 mg (0.0643 mmol) of the polymer obtained as in (C) were dissolved in 20 ml of dichloromethane, and a 0.1N solution of SbCl$_5$ in dichloromethane was added until the intense violet coloration of the solution which occurred initially had disappeared to give a pale greenish coloration. 20 ml of water were then added under nitrogen, and the mixture was stirred well for 10 minutes. The organic phase was washed with water, filtered and dried. Work-up of the solution gave the polymer of the formula (16) below as a violet film or precipitate.

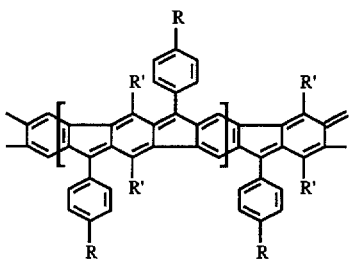

(16)

Example 2

(A) A solution of 0.725 g (1 mmol) of 4,4"-didecyl-4',6'-dibromoisophthalophenone and 0.334 g (1 mmol) of 2,5-dihexyl-1,4-phenylenediboronic acid in 5 ml of toluene was added under an inert gas to 5 ml of 2N sodium carbonate solution. The mixture was refluxed, and 30 mg (0.026 mmol) of tetrakis(triphenylphosphino)palladium(0) in 5 ml of toluene were then added. After the mixture had been refluxed for 24 hours, it was poured into methanol, the polymer thus precipitated was taken up in a little toluene, and the solution was dried and evaporated. Reprecipitation by means of methanol gave 620 mg of the polymer of the formula (17) below (R=n-decyl; R'=n-hexyl).

Yield: 77% of theory.

Molecular weight according to gel permeation chromatogram:

Number average ($M_n$): 5,200; weight average: ($M_w$): 7,100.

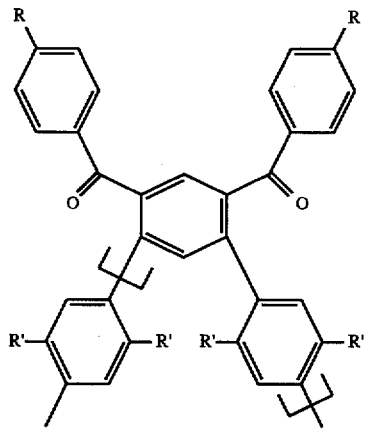

(17)

(B) A suspension of 210 mg (5.52 mmol) of $LiAlH_4$ in tetrahydrofuran was added dropwise to a solution of 600 mg (0.741 mmol) of the polymer prepared as in (A) in 50 ml of toluene. After the mixture had been stirred at room temperature for 30 minutes, the excess hydride was carefully decomposed, and the mixture was washed with 2N hydrochloric acid and with water. The organic phase was dried, the solvent mixture was removed by distillation, and the polymer was taken up in a little tetrahydrofuran and precipitated in water, giving 530 mg of the polymer of the formula (18) below.

Yield: 88% of theory.

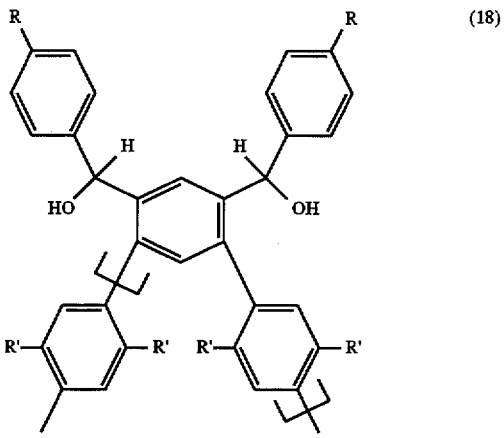

(18)

(C) 500 mg (0.615 mmol) of the polymer prepared as in (B) were dissolved in 30 ml of dichloromethane, and 1.8 g (12.7 mmol) of boron trifluoride diethyl etherate were added. After 5 minutes, 10 ml of ethanol were added to the mixture with stirring, and finally 50 ml of water were added. The organic phase was washed, dried and evaporated. 430 mg of the polymer of the formula (19) below were precipitated from acetone.

Yield: 90% of theory.

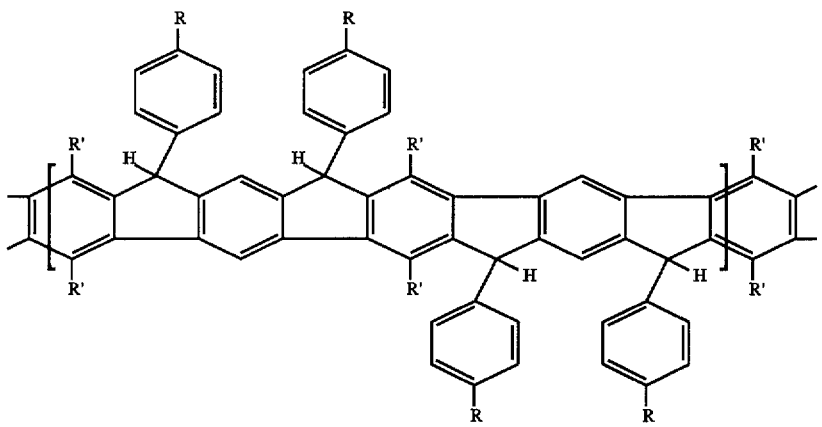

(19)

(D) A 0.1N SbCl$_5$ solution in dichloromethane was added to a solution of 50 mg (0.0643 mmol) of the polymer prepared as in (C) in 20 ml of dichloromethane until the pale violet coloration of the solution which occurred initially disappeared to give a green coloration. 20 ml of water were then added under nitrogen, and the mixture was stirred well for 20 minutes. The organic phase was separated off, washed with water, filtered and dried. Work-up of the solution gave the polymer of the formula (20) below as a pale violet film or precipitate.

3. A polymer as claimed in claim 1, which is finely distributed in a further polymer.

4. A process for the preparation of a polymer as claimed in claim 1, which comprises:

(A) polymerizing at least one compound of the formula (2)

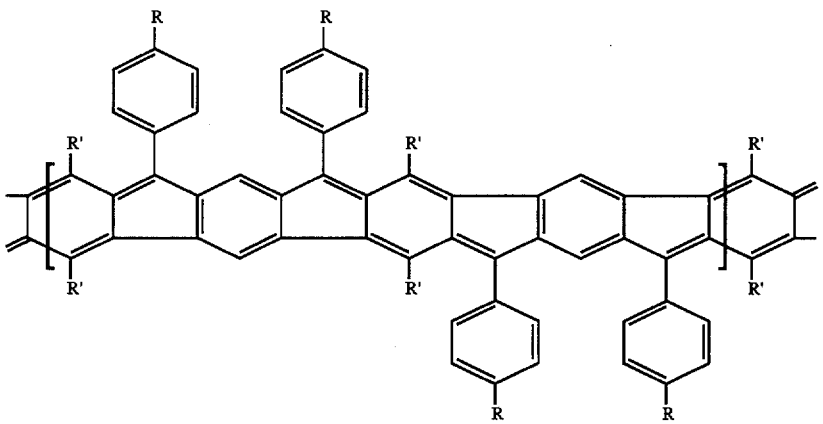

(20)

We claim:

1. A polymer having recurring units of the formula (1)

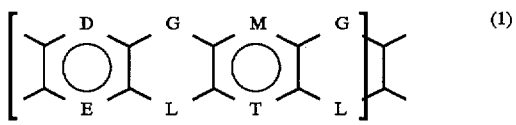

in which

D, M, E and T, independently of one another, are each a radical of the formula C—R in which C is a carbon atom, and R are identical or different radicals, of the group consisting of hydrogen atoms and optionally substituted C$_1$- to C$_{20}$-hydrocarbon radicals, wherein in each ring one of G and L is a single chemical bond, and in each ring the group G and L which is not a single bond is a radical of the formula CR$_2$, where at least one of the radicals R is a hydrogen atom.

2. A polymer as claimed in claim 1, which contains from 0.01 to 30 percent by weight of a dope.

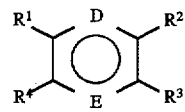

with at least one compound of the formula (3)

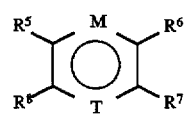

in the presence of at least one heavy metal, heavy metal compound or mixtures thereof, where, in the above formulae (2) and (3), two of the radicals R$^1$, R$^2$, R$^3$ and R$^4$ are halogen atoms and the other two of the radicals R$^1$, R$^2$, R$^3$ and R$^4$ are radicals of the formula —C(R)=O, and two of the radicals R$^5$, R$^6$, R$^7$ and R$^8$ are radicals of the formula —B(OR)$_2$, and the two other radicals R$^5$, R$^6$, R$^7$ and R$^8$ are each as defined for the radical R, (B) reducing the carbonyl groups to carbinol groups, and (C) condensing the resultant polymer with the carbinol groups with cyclization.

5. The process claimed in claim 4, further comprising the step of dehydrogenating the resultant polymer.

6. The process as claimed in claim 4, further comprising the step of adding dopants to said polymer.

7. The process as claimed in claim 6, wherein said dopants are selected from the group consisting of alkali metals, protonic acids, Lewis acids, halogens and mixtures thereof.

8. The process as claimed in claim 6, wherein the step of adding said dopants comprises exposing the polymer to vapors or solutions containing said dopant.

9. The process as claimed in claim 8, wherein the step of exposing the polymer is carried out at a temperature from about 10° to about 30° C.

10. The process as claimed in claim 4, wherein said halogen atoms comprise bromine atoms.

11. The process as claimed in claim 4, wherein said heavy metal compound comprises palladium, nickel or mixtures thereof.

12. The polymer as claimed in claim 3, wherein said further polymer is a thermoplastic polymer.

13. The polymer as claimed in claim 1, further comprising a dopant selected from the group consisting of alkali metals, protonic acids, Lewis acids, halogens and mixtures thereof.

14. A method of using a polymer as claimed in claim 1, comprising the step of incorporating said polymer in electrical, electronic or opto-electronic components.

15. A method of using a polymer as claimed in claim 1, comprising the step of incorporating said polymer in electrical, electronic or opto-electronic components.

16. The process as claimed in claimed 6, wherein said halogen atoms comprise bromine atoms.

17. The process as claimed in claim 6, wherein said heavy metal compound comprises palladium, nickel or mixtures thereof.

18. The polymer as claimed in claim 13, which is finely distributed in a further polymer.

* * * * *